Nov. 7, 1950     R. CARTER     2,529,328
MOWING MACHINE
Filed March 31, 1948     2 Sheets-Sheet 2
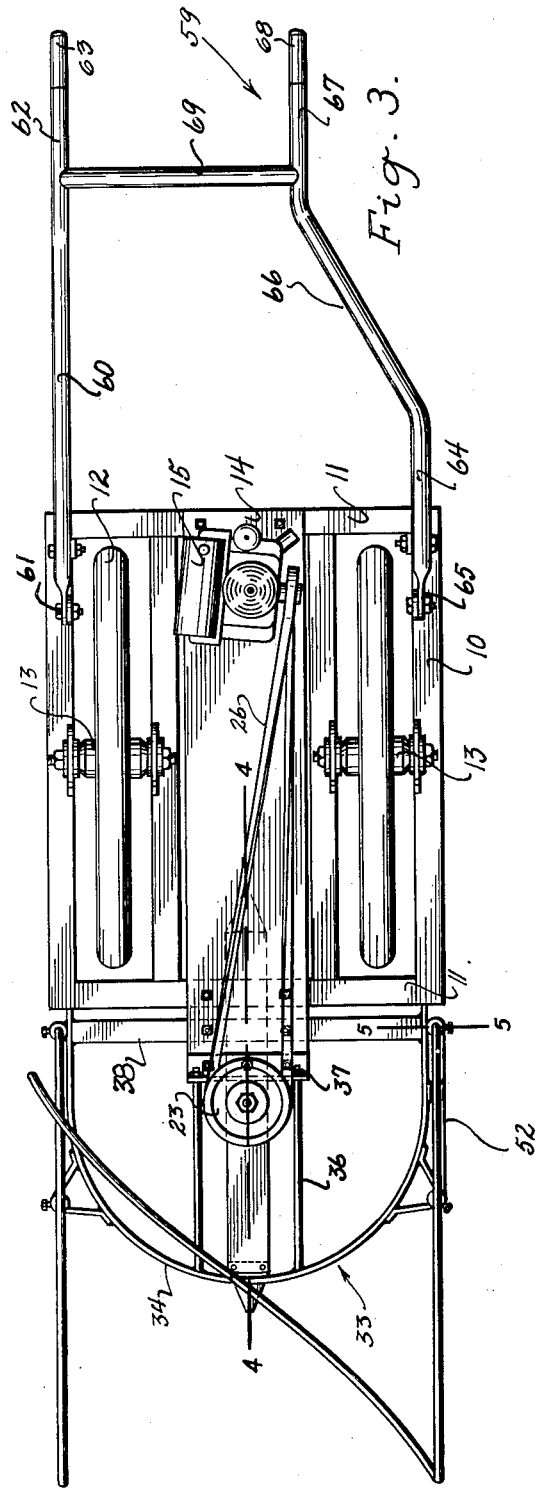
INVENTOR.
RAYMOND CARTER
BY
Jerome W. Paxton
AGENT.

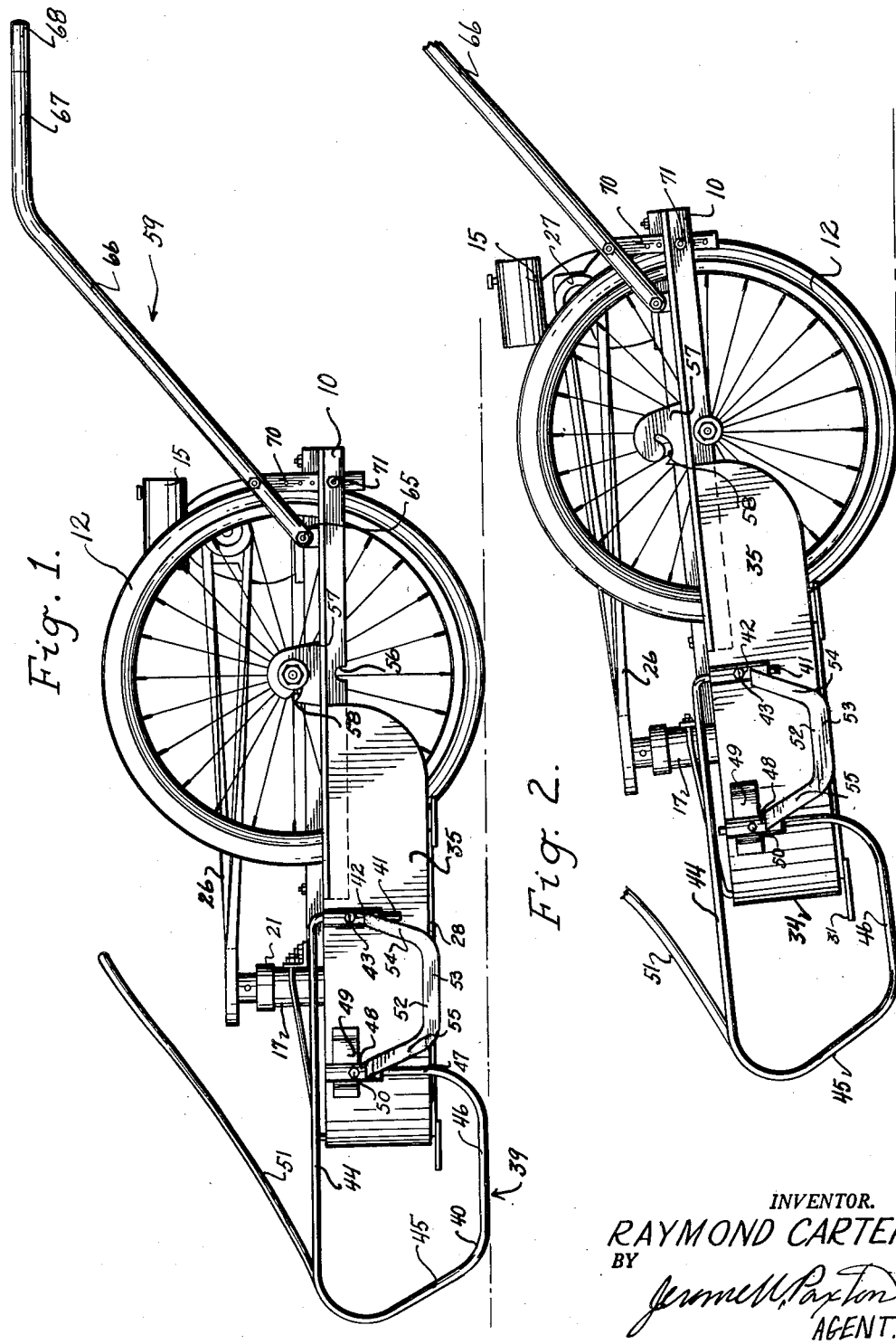

Patented Nov. 7, 1950

2,529,328

UNITED STATES PATENT OFFICE 2,529,328

MOWING MACHINE

Raymond Carter, Wyoming, Ill.; Hazel Carter and Raymond Hugh Carter administrators of said Raymond Carter, deceased Application March 31, 1948, Serial No. 18,272

8 Claims. (Cl. 56—25.4)

The present invention relates generally to mowing machines, and more particularly is directed to a mowing machine capable of being employed for cutting weeds along relatively inaccessible areas, and also capable, by means of a minor adjustment, of being used for mowing lawns and the like.

I am, of course, aware that lawn mowers of the conventional types have been provided with attachments for enabling the lawn mower to be employed for weed cutting, but these prior constructions are not entirely satisfactory, and the present invention includes several novel features not heretofore utilized.

Viewing the invention broadly, it comprises a wheeled frame having mounted thereon a suitable power plant adapted to impart rotary movement to a mandrel rigidly carried by the frame. A cutting blade is fastly secured to the mandrel and a guard protects the mandrel from the cut weeds, and this guard is suitably affixed to the frame. The forward end of the machine is provided with shoes or runners capable of vertical adjustment for raising or lowering the forward end of the machine, and the wheels of the frame are also adjustable vertically to enable the machine to be used for either cutting weeds or mowing lawns.

An important object of the present invention is to provide a machine of the character described with a guard which positively protects the mandrel for imparting rotational movement to the cutting blade from having weeds wrapped therearound as the weeds are moved across the machine after cutting.

Another object of the present invention is to provide a mowing machine of the type described with adjustment devices carried by the frame whereby the running wheels may be positioned to raise the rear end of the frame and tilt the forward end of the cutting blade downwardly for efficient operation in the cutting of weeds, or maintain the frame in a substantially parallel relation with respect to the ground, whereby the blade may be used for lawn mowing purposes.

And still another object of the present invention is to provide a highly mobile mowing machine wherein one of the operating handles is so constructed as to enable the machine to mow very closely to a fence or other object, without subjecting the operator's hand to possible injury.

Yet another object of the present invention is to provide a machine of the character described with a guiding rod or the like at the forward end thereof for protecting the operator and the working parts of the machine from large falling weeds and at the same time guide these weeds to fall to one side of the machine.

And yet another object of my invention is to provide a machine of the type mentioned with adjustable shoes or runners at the forward end thereof, whereby the forward end of the machine may be raised or lowered to the desired height.

A further object of the present invention is to provide a mowing machine for cutting weeds and mowing grass or the like which is relatively simple in structural detail, positive and efficient in operation, and capable of being cheaply and inexpensively manufactured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation of a machine constructed in accordance with my invention and illustrating the machine in the position employed for mowing lawns.

Figure 2 is also a view in side elevation illustrating the position of the machine which is generally employed for weed cutting.

Figure 3 is a top plan view of the machine shown in Figure 1.

Figure 4 is an enlarged sectional view taken along the line 4—4 of Figure 3, looking in the direction of the arrows.

Figure 5 is an enlarged sectional view taken along the line 5—5 of Figure 3, looking in the direction of the arrows.

Referring to the drawings, and more particularly to Figure 1, I have shown a frame preferably, though not necessarily, formed of longitudinally extending channels 10 suitably connected at their front and rear ends by transversely extending channels 11. A pair of ground engaging wheels 12, each of which is provided with an axle 13, cooperate with the frame for enabling it to be readily moved along the ground. A supporting base 14 is suitably bolted to the transversely extending channels 11 intermediate the wheels 12, and a gasoline engine 15 is attached to the base 14 adjacent the rear end thereof. The engine is bolted to the supporting base by means of slotted apertures which will permit limited forward and rearward movement of the motor for tightening or loosening the drive belt, as will later be more fully discussed.

An angle iron assembly 16 is securely bolted to the forward end of the supporting base 14, and a vertically disposed housing 17 is welded to the angle iron assembly 15. A mandrel 18 extends through the housing 17 and is provided with upper and lower bearings 19. Suitable washers 20 are provided at each end of the housing 17, and closure caps 21 and 22 are threaded onto the upper and lower extremities of the housing 17, as clearly shown in Figure 4. The housing is filled with a lubricant such as gun grease for the usual purposes. A pulley 23 is secured to the upper end of the mandrel 18 which extends through an aperture in the cap 21 by means of a set screw 24, and a lock nut 25 is threaded onto the upper end of the mandrel. A drive belt 26, preferably a V-belt, is trained around the pulley 23 and a pulley 27 carried by the drive shaft of the gasoline engine 15. Manifestly, when the engine 15 is running, the rotary movement will be transmitted to the mandrel 18 by virtue of the drive belt 26.

A blade bar 28 has a nut 29 arc welded thereto at approximately the midpoint of the bar 28. The nut 29 is threaded onto the lower end of the mandrel 18 and is properly secured by means of a jamb nut 30. A sickle section 31 is secured to each end of the blade bar 28 by rivets 32, although a bolt and nut assembly may be employed, if desired. The sickle sections 31 provide the cutting surfaces and may be easily and quickly changed, if the occasion arises.

To protect the mandrel from having weeds wrapped therearound, it will be noted that a guard, designated generally 33, is formed with an arcuate front wall 34 and parallel longitudinally extending walls 35. The guard 33 is secured to the channels 10 such as by welding the side walls 35 thereto, although it is to be understood that other attaching means may be employed. As shown in Figure 1, the guard 33 extends upwardly to a point approximately one-half of the height of the housing 17 and downwardly to a point adjacent the blade 28 but spaced from the sickle sections 31. The arcuate wall 34 of the guard may be further stabilized by means of parallel rods 36 secured at one end to the wall 34 and at the opposite ends to the angle iron assembly 16, as shown at 37. A laterally extending brace 38 extends between the side walls 35 for additional supporting purposes.

To enable the forward end of the machine to be raised or lowered to the desired height, it will be noted that in Figures 1 and 3 that I have provided a pair of shoes or runners, designated generally 39. Each runner comprises a bar 40, one end of which is bent to form a vertical portion 41 which extends downwardly in a sleeve 42 brazed or welded to the side wall 35 of the guard 33, and a set screw 43 will hold the vertical portion 41 in the desired position. The rod 40 is provided with a horizontally extending portion 44 which extends a substantial distance forward of the sickle section 31 and is then bent downwardly and rearwardly, as shown at 45, and then horizontally, as at 46, to provide a ground engaging member. The rod 40 is then bent upwardly, as shown at 47, and extends into a sleeve 48 carried by a bracket 49 secured to the guard 33, as shown in Figure 3. A set screw 50 is also provided for the sleeve 48. Manifestly, by manipulation of the set screws 43 and 50, it is apparent that the position of the ground engaging surface 46 may be raised or lowered for raising or lowering the front end of the machine.

A weed guiding bar or the like 51 is conveniently secured to the portion 44 of the runner 39 located on the left side of the machine, and this bar extends upwardly and transversely of the guard 33 and terminates a short distance beyond the right side of the machine, as clearly shown in Figure 3. This construction is important, in that the operator of the machine and also the driving parts of the machine will be protected from large falling weeds, since the rod 51 will cause them to fall to the right side of the machine.

To protect the sickle sections 31 from striking a fence or fence post when the machine is moving closely to the fence, it will be observed that a guard 52 is provided on the left hand side of the guard 33. The guard 52 comprises a U-shaped bar 53 and the vertical arms 54 and 55 are attached to the sleeves 42 and 48. It will be noted that the horizontal portion of the guard is approximately parallel to the lower edge of the guard 33 and that the sickle sections 31 will clear the guard 52 by approximately one-quarter of an inch. While for the purpose of illustration, the blade bar 28 is of such length that the arc of travel of the sections 31 is beyond the runner 44, it is to be understood that under operating conditions, the blade is of a length that the sickle sections project substantially to the edge of the runners 44.

As previously mentioned, I provide means whereby the wheels 12 may have two vertical adjustments and, to accomplish this end, it will be noted that the channels 10 are provided with recesses 56 of sufficient dimensions to accommodate the axles 13 of the wheels 12. By disposing the axles 13 in the recesses 56, it can be seen from Figure 2 that the rear end of the machine will be raised, thus tilting the blade 28 downwardly, which means that the rear of the blade will clear stubs of weeds which have already been cut or any other obstacles which may be present. Upwardly extending ears 57 are also secured to the upper face of the longitudinal channels 10 above the recesses 56, and each of the ears 57 is provided with an arcuate slot 58. Obviously, by disposing the axle 13 in the slot 58, the frame 10 will assume a substantially horizontal position, whereby the blade 28 may be employed for mowing grass. The conversion of the machine from a grass mowing position to that for cutting weeds is a very simple alteration and can be accomplished in a minimum of time.

To move the machine for cutting or mowing purposes, I provide a handle assembly 59. As shown in Figure 3, the handle 59 includes a tubular portion 60 which is pivotally mounted at its inner end to the frame, as shown at 61, and extends upwardly at an angle thereto. The tubular member 60 terminates in a horizontally extending element 62 and may be provided with a hand grip or the like 63. A second tubular member 64 which is in parallel relationship to the tubular member 60 is also pivoted to the frame, as shown at 65, and the member 64 is inclined inwardly a substantial distance, as shown at 66, and then terminates in a horizontally extending portion 67 which is also parallel to the portion 62 and is provided with a hand grip 68. A cross brace 69 extends between the portions 62 and 67 for reinforcing purposes. By providing the tubular member 64 at the left hand side of the machine with the inwardly inclined portion 66, it is apparent that the operator may mow very close to a fence or other obstacles without any danger of injury to his hand. This arrangement thus enables the machine to mow within an inch of the fence and the efficacy thereof is thought readily apparent.

The operation of the machine is thought to be clear from the foregoing description, but it should be mentioned that when cutting weeds the runner or shoe 39 provided on the right hand side of the machine is removed by detaching the runner from the sleeves 42 and 48. This is done so that the weeds may be thrown to the right and thereby clear the machine and, as above indicated, any large weeds are prevented from being discharged onto the machine or operator by the rod 51 which will guide such weeds to the right hand side of the machine.

The angular position of the handle assembly 59 may be changed and, to accomplish this end, it will be noted that an adjusting bar 70 provided with a plurality of spaced apertures is secured to the rear end of the outermost longitudinally extending channels 10 by a nut and bolt assembly 71 and the operation of this arrangement is believed obvious.

It will be appreciated from the foregoing that I have provided a mowing machine which may be readily converted from use in mowing lawns or the like to a position whereby weeds may be readily cut and deposited to one side of the machine. By virtue of the particular structural details of the handles and more particularly that handle portion along the left side of the machine, the operator may cut very closely to any obstacles, such as fences, without injury to his hand and, under actual working conditions, it is possible to mow within an inch of any obstacles. In addition, the provision of the guard at the forward end of the machine protects the mandrel from becoming entangled with the cut weeds, and the guiding bar extending laterally of the machine from one of the runners will also prevent large weeds from being deposited on the working parts of the machine or onto the operator. The machine includes relatively few essential parts and by conventionally mounting the motor, not shown, so that it has limited forward and backward movement, the drive belt between the motor and the mandrel may always be maintained under proper operating conditions.

I claim:

1. In a mowing machine of the type having a wheeled frame, a cutting blade supported by the frame for rotation about a vertical axis and means to impart rotary movement to the blade, the improvement comprising a substantially U-shaped shield secured to the frame and extending forwardly of the cutting blade support, and a guard attached to one of the sides of said U-shaped frame spaced from and in parallel relationship to said side to protect the cutting blade the outer end of the guard being located rearwardly of the front of the U-shaped shield.

2. In a mowing machine of the type having a wheeled frame, a cutting blade supported by the frame for rotation about a vertical axis and means to impart rotary movement to the blade, the improvement comprising a substantially U-shaped shield secured to the frame and extending forwardly of the cutting blade support, at least one vertically disposed sleeve secured to each of the side walls of the shield, a pair of runners adapted to be located at each side of the shield, a support on each of the runners adapted to extend into said sleeve, and means to secure said supports to the sleeves.

3. A mowing machine as claimed in claim 2 wherein a guide bar is secured to one of said runners and extends transversely of the machine and terminates beyond the opposite runner for guiding cut weeds to one side of the machine.

4. In a mowing machine of the type having a wheeled frame, a cutting blade supported by the frame for rotation about a vertical axis and means to rotate the blade, the improvement comprising a substantially U-shaped shield secured to the frame and extending forwardly of the cutting blade support, a pair of vertically disposed sleeves secured to each of the side walls of the shield, a pair of runners each of which is adapted to have its free ends extend into said sleeves, and means to secure the free ends to the sleeves.

5. A mowing machine as claimed in claim 4 wherein a guard is secured to the sleeves on one side of said shield whereby said guard will be spaced from and in parallel relation to said side to protect the cutting blade.

6. In a mowing machine as claimed in claim 4 wherein a pair of upwardly extending handle members are secured to the frame, one of said handles being a straight member terminating in a grip portion at the free end and the other of said handle members extending inwardly of the frame at an angle and terminating in a grip portion arranged in parallel relationship to said first named grip portion whereby the last mentioned handle member is located a substantial distance inwardly of the frame.

7. In a mowing machine of the type having a wheeled frame, a cutting blade supported by the frame for rotation about a vertical axis and means to rotate the blade, the improvement comprising a substantially U-shaped shield secured to the frame and extending forwardly of the cutting blade support, a pair of vertically disposed sleeves secured to each side of said shield, a pair of runners, each free end of each runner being adapted to extend into said sleeves, means to secure the free ends of said runners in said sleeves, a guard adapted to be secured to the sleeves on one of said sides in spaced parallel relation to said side to protect the cutting blade, a pair of spaced upwardly extending handle members attached to the opposite end of the frame, and the said member on the side of the machine on which the guard is secured to the side of the shield being so formed that the free end thereof is spaced a substantial distance inwardly of the machine and in parallel relation to the free end of the other of said upwardly extending handle members.

8. A mowing machine as claimed in claim 7 wherein a guide bar is secured to one of said runners and extends transversely of the machine and terminates adjacent the opposite runner to guide cut weeds to one side of the machine.

RAYMOND CARTER.

REFERENCES CITED

The following references are of record in the file of this patent:

UNITED STATES PATENTS

| Number | Name | Date |
|---|---|---|
| 384,787 | Richards | June 19, 1888 |
| 1,135,071 | Swanson | Apr. 13, 1915 |
| 2,216,313 | Fulton | Oct. 1, 1940 |
| 2,281,639 | Swan | May 5, 1942 |
| 2,359,358 | Dielschneider | Oct. 3, 1944 |
| 2,466,620 | Swift et al. | Apr. 5, 1949 |
| 2,472,414 | Geater | June 7, 1949 |